(12) United States Patent
Sastry et al.

(10) Patent No.: US 8,231,998 B2
(45) Date of Patent: Jul. 31, 2012

(54) DEPOSITED MICROARCHITECTURED BATTERY AND MANUFACTURING METHOD

(75) Inventors: Ann M. Sastry, Ann Arbor, MI (US); Fabio Albano, Ann Arbor, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 1157 days.

(21) Appl. No.: 12/059,366

(22) Filed: Mar. 31, 2008

(65) Prior Publication Data

US 2008/0248382 A1 Oct. 9, 2008

Related U.S. Application Data

(60) Provisional application No. 60/909,183, filed on Mar. 30, 2007, provisional application No. 60/938,232, filed on May 16, 2007.

(51) Int. Cl.
*H01M 2/14* (2006.01)
*H01M 6/42* (2006.01)
*H01B 13/00* (2006.01)

(52) U.S. Cl. .......................... 429/129; 429/149; 216/13
(58) Field of Classification Search .................. 429/129, 429/149; 216/13
See application file for complete search history.

(56) References Cited

U.S. PATENT DOCUMENTS

| | | | |
|---|---|---|---|
| 5,524,339 A | 6/1996 | Gorowitz et al. | |
| 5,633,097 A | 5/1997 | Miller | |
| 6,379,835 B1 * | 4/2002 | Kucherovsky et al. | 429/118 |
| 7,049,962 B2 | 5/2006 | Atherton et al. | |
| 2002/0092558 A1 * | 7/2002 | Kim et al. | 136/244 |
| 2003/0118897 A1 | 6/2003 | Mino et al. | |
| 2005/0175894 A1 | 8/2005 | Visco et al. | |
| 2006/0001137 A1 | 1/2006 | Hundt et al. | |
| 2006/0038536 A1 | 2/2006 | LaFollette et al. | |
| 2006/0249705 A1 | 11/2006 | Wang et al. | |
| 2006/0252906 A1 | 11/2006 | Godschalx et al. | |

OTHER PUBLICATIONS

K.A. Cook et al., "POWER (Power Optimization for Wireless Energy Requirements): A MATLAB Based Algorithm for Design of Hybrid Energy Systems;" Journal of Power Sources, 159, 2006, pp. 758-780.
Sammoura, F., et al., "Water-Activated Disposable and Long Shelf Life Microbatteries," Sensors and Actuators, A-Physical, 111, 2004, pp. 79-86.
Singh, P., et al., "RF-Recharged Microbattery for Powering Miniature Sensors," Proceedings of the IEEE Sensors, 1-3, 2004, pp. 349-352.
International Search Report for International Patent Application PCT/US08/58923 dated Oct. 6, 2008.

* cited by examiner

*Primary Examiner* — Karie O'Neill Apicella
(74) *Attorney, Agent, or Firm* — Richard T. Ogawa; Ogawa P.C.

(57) ABSTRACT

A battery includes a first portion including a substrate having formed thereon a current collector and an anode electrode material. A second portion is formed on a substrate and includes a current collector and a cathode electrode material. The first portion is joined to the second portion and a separator is disposed between the first portion and the second portion as joined to separate the anode electrode material from the cathode electrode material. An electrolyte is placed in contact with the anode electrode material, the cathode electrode material and the separator.

14 Claims, 2 Drawing Sheets

DEPOSITED MICROARCHITECTURED BATTERY AND MANUFACTURING METHOD

CROSS-REFERENCE TO RELATED APPLICATIONS

This application claims priority to and benefit from U.S. Provisional Patent Application Ser. Nos. 60/909,183, filed Mar. 30, 2007 entitled Micromachined Battery and 60/938,232, filed May 16, 2007 entitled Micromachined Battery, the disclosures of which are hereby incorporated herein by reference for all purposes.

GOVERNMENT FUNDING

The U.S. Government may have certain rights in this invention as provided for by the terms of Contract No. EEC 9986686 awarded by The National Science Foundation—Wireless Integrated Microsystems Engineering Research Center (NFS-WIMS ERC).

TECHNICAL FIELD

This patent relates to energy storage systems. More particularly, this patent relates to a deposited microarchitectured battery system and a design and manufacturing method for the same.

BACKGROUND

Many micro-electromechanical systems (MEMS) require a power source of electrical energy. In some instances electrical power is provided by a coupled battery or battery system. The size advantage of the MEMS device is lost if the battery is large. Physical limitations of the electrode materials, separators, and electrolyte dictate their separate manufacture, and subsequent coupling of the battery to the MEMS device.

MEMS technology also has enabled development of fully implantable medical devices. The power supplies for these devices, however, can account for up to 85% of the mass and 35% of the volume of these systems. The smallest commercially available batteries are in the millimeter (mm) range and utilize zinc or lithium chemistries. Stainless steel casing is typically used to contain the fluid electrolyte and the gaseous reaction byproducts.

Further miniaturization of implantable systems requires new battery technologies with enhanced compatibility with MEMS fabrication techniques and with MEMS-processing compatible materials and substrates. Power source selection will also rely on more than the electrochemistry. Form factor, performance, lifetime, toxicity of the chemistry and the rate of heat generation must be considered in the design process. This is particularly true with implantable systems.

SUMMARY OF THE INVENTION

Embodiments of the present invention relate to microarchitectured batteries. These batteries can be used to create microscopic footprints, typically on the order of 1 $mm^2$, and can be integrated directly into MEMS devices at the time of manufacture. Microarchitectured batteries have the potential to overcome the energy and power limitations of the past for MEMS, and will enable the widespread utilization of MEMS devices for creating wireless sensor networks for environmental or bio-medical applications; this is because power sources can be created which are of the same scale as other components of the system. By using improved fabrication processes to deposit battery materials, energy losses can be reduced and storage capability increased, enabling microbatteries with sizes that can be integrated with MEMS and meet their lifetime requirements.

DETAILED DESCRIPTION

MEMS devices may benefit from a thin-film, microarchitectured, deposited battery that can be manufactured with or in a manner compatible with the manufacture of the MEMS device. A microbattery may be manufactured using processing techniques used for MEMS devices themselves. In this manner, the microbattery may be manufactured to have a footprint no larger than the device itself, may be manufactured during the processing or using the same processing techniques as the MEMS device. The microbattery may be directly coupled to the MEMS device, eliminating additional process steps. Other microarchitecturing processes can be applied to the substrates to create spacing, connections or microchannels for electrolyte, e.g. laser machining, micro-drilling, micro-cutting or similar processes. While several embodiments of the invention are described in connection with battery structures suitable for combination with MEMS devices, the techniques are scalable to larger dimensions. Therefore, the present invention can be applied to the design and manufacture of batteries for integration into much larger format applications, including larger portable devices such as cell phones, personal digital assistants (PDAs) and laptop computers, flat photovoltaic arrays, and large format, high power prismatic or wound cells which power a large variety of devices, including vehicles, or to provide load-leveling for grid power installations.

Figure 1:
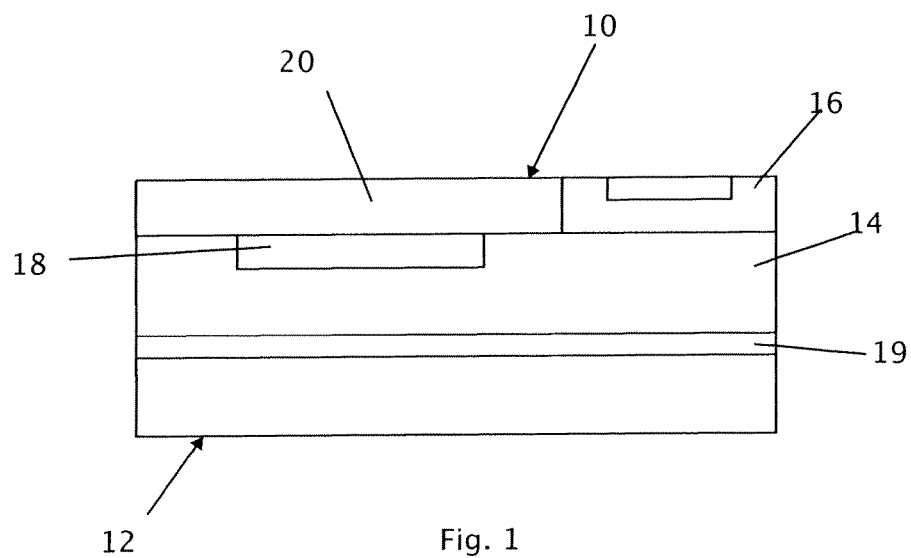
FIG. 1 is a schematic illustration of a micro-electromechanical system including a coupled micromachined battery in accordance with an embodiment of the invention.

FIG. 1 illustrates a MEMS device 10 and a coupled micromachined battery 12. The MEMS device may include a glass, silicon-based substrate 14, e.g., silicon dioxide (SiO2); a transducer 16 formed on the substrate 14 and circuitry 18, e.g., a processor, formed in the substrate 14. A cover 20 may enclose the circuit 18 leaving the transducer exposed. The instant invention is not limited to the particular structure of the MEMS device or its intended function, including whether the MEMS device is or includes a transducer or whether or not the MEMS device includes processing circuitry or similar structures. Thus, the MEMS device may be virtually any type of MEMS device that has an electrical power requirement.

The micromachined battery 12 is coupled to the MEMS device 10, and the micromachined battery 12 may be bonded, for example, to the MEMS device 10 using polymer adhesive 19, e.g. two parts epoxy resin.

Figure 2:
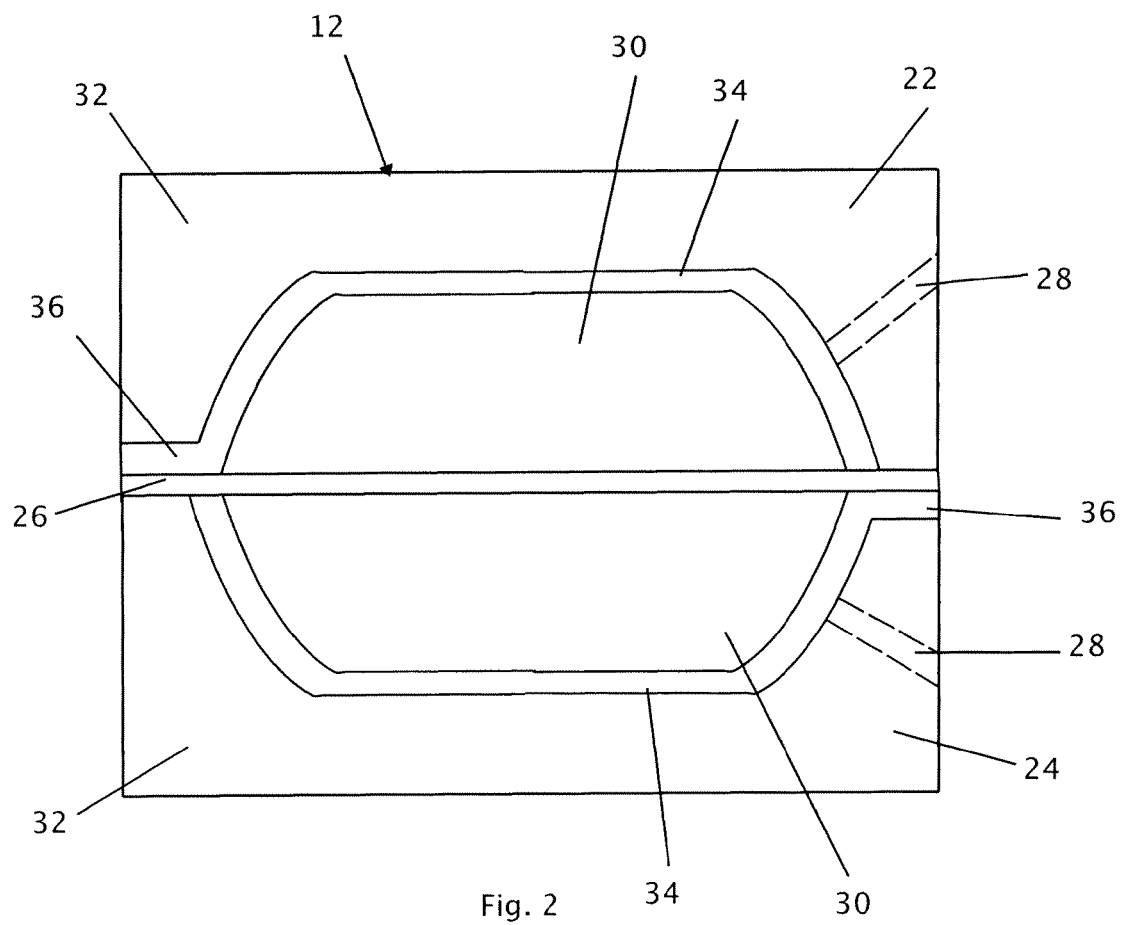
FIG. 2 section view of a micromachined battery in accordance with an embodiment of the invention.

FIG. 2 illustrates a microbattery, for example the microarchitectured battery 12, in section. In this realization, the substrate has been machined using microdiamond drills to create a spacing between electrodes suitable to contain solid, gel or liquid electrolyte. The microarchitectured battery 12 includes a first section 22 and a second section 24 with a separator 26 positioned between the two sections. The two sections respectively define an anode and a cathode and therefore differ at least in the electrode material. The sections may be secured together by adhesive, for example a fast curing epoxy resin, with the separator 26 being disposed in between. The separator 26 may be a membrane formed from polymer such as Celgard®, or other polymeric membranes with nanometer sized pores, and may be approximately 25 micrometer (μm) thick, down to 100 nm.

Electrolyte may be introduced using microfluidic channels 28 (depicted in phantom as these channels are sealed following introduction of the electrolyte) formed in one or both of the sections. In a preferred implementation, introduction of the electrolyte is delayed until the MEMS device is placed into operation to increase the shelf life and then the usable life of the device.

Each section 22 and 24 may be formed by the deposition of electrode material 30 onto a substrate 32. A suitable current collector structure 34 is also deposited onto the substrate 32 advantageously during the electrode deposition process or as a follow-on process. The current collector 34 may be formed to include conductive taps 36 to allow an output of the battery to be coupled to the MEMS device 10. Deposition of electrode active material may be accomplished by laser machining, e.g. Nd-YAG laser, or other type of laser) in combination with pulsed laser deposition (PLD), electron beam deposition (EBD), chemical vapor deposition (CVD), physical vapor deposition (PVD), chemical fluid deposition (CFD) or electroplating, or any combination of the above.

In one realization, and not to limit the general nature of the microarchitectured battery 12, substrates 32 for the anode and the cathode, may be prepared by first forming masks using computer-aided design and printing techniques. A photoresist may be spin coated onto blank substrate stock, such as wafer stock, and cured using ultraviolet (UV) light exposure or other method. The photoresist may be selectively removed by a solvent. The substrate is then etched to the desired depth using an etchant, such as fluoridic acid (HF), or other etchant which can uniformly and controllably remove material.

As an alternative to wet etching, laser ablation may be used to etch the substrate. Laser ablation offers potentially fewer processing steps and faster processing speeds. However, wet etching may potentially provide better control of the etched depth, and depth of the cavity geometry.

The first section 22, in this example, a zinc (Zn) anode, may by formed using three metal deposition steps. A layer of nickel (Ni) (not depicted), or other metallic or metal oxide materials, for adhesion purposes, may be deposited onto the etched substrate followed by a gold (Au) or other conductive current collector, e.g., current collector 34. A layer of zinc is then deposited for the active material, e.g., electrode material 30. In this embodiment, zinc (Zn), is deposited via aerosol spray deposition of Zn nanoparticles suspended in petroleum or other distillate. In accordance with another embodiment, the electrode material 30 may include a material selected from the group including zinc, lithium metal (Li), graphite (C), meso carbon micro beads (MCMB), other carbon intercalation compounds, and a combination thereof.

The second section 24, in this example a silver oxide (AgO) cathode, may be formed using three metal deposition steps. A layer of nickel (Ni) (not depicted), or other metallic or metal oxide material, for adhesion purposes, is deposited onto the etched substrate followed by a gold (Au) or other conductive current collector, e.g., current collector 34. A layer of silver is then deposited for the active material, e.g., electrode material 30. Following placement of the silver active material, the silver is oxidized to silver oxide. The oxidation may be accomplished by immersing the structure in hydrogen peroxide ($H_2O_2$) until the silver material is sufficiently oxidized. Alternatively, oxidation of the metal may be achieved by exposing the film to UV rays in an ozone atmosphere ($O_3$). Other oxidative agents or atmospheres can be utilized for this purpose, e.g., exposing the substrate film to oxygen ($O_2$) during metal deposition. In accordance with another embodiment, the electrode material 30 may include a material selected from the group including silver oxide, lithium manganese oxide $LiMn_2O_4$ lithium iron phosphate ($LiFePO_4 LiNi_xCo_yAl_zO_2$, $LiNi_xCo_yMn_zO_2$, and a combination thereof.

Any suitable metal deposition technique may be employed. PVD may offer faster deposition of thick (greater than 10 μm) metallic layers than other processes. Electroplating may be alternatively used, if the required thickness of the active material exceeds the thickness possible via PVD or sputtering, for the film. The thickness of the current collector is generally less than the thickness of the active material and may be formed by any suitable technique. Chemical fluid deposition offers the advantage of being a lower temperature process and may reduce the number of processing steps. While sintering may be used to deposit silver powder onto the substrate, this process may be less desirable because of the required processing temperatures. The surface finish of the final electrode structure depends strongly on the temperature of the substrate and on the evaporation technique used. PVD is conducted at lower substrate temperatures, creating substrates of higher porosity and rougher surface finishes. The deposited films may be amorphous, and may require subsequent heating to induce re-crystallization. The porous structure is beneficial for battery electrodes employing liquid electrolytes because of the active surface area afforded, and the permeability to electrolyte, while maintaining electronic conductivity and mechanical integrity.

If necessary, multiple substrates may be prepared on a wafer or other base structure. After etching, metal deposition and oxidization steps are completed as needed to achieve proper specific and gravimetric energy and power characteristics. Individual substrates may be separated from the wafer using standard cutting techniques. Cooling water should not be used during dicing of anode parts to prevent oxidation of the zinc.

Sub-millimeter diameter channels or apertures 28, for example, on the order of 100 μm diameter, are formed in the substrate 32 to allow for the introduction of electrolyte, for example, potassium hydroxide (KOH), diethyl carbonate (DEC), dimethyl carbonate (DMC), ethylene carbonate (EC), ethyl methyl carbonate (EMC), propylene carbonate (PC), or other electrolyte which conducts ions but is electrically neutral, into a completed microarchitectured battery structure 12 with simultaneous evacuation of air. Alternatively, gel-type electrolytes may be used and enclosed within the microbattery structure during the joining and sealing of the sections, or may be inserted afterward, using passages formed in the substrate suitable for this purpose.

Micromachine drilling or chemical drilling may be used to form the apertures 28. Optional glass channels (not depicted) may be inserted into the formed holes and secured therein using a fast curing epoxy resin. Following introduction of the electrolyte, the glass channels, if present, may be cut from the package and the apertures 28 sealed using epoxy.

In the foregoing example, individual substrates are separated prior to assembly into battery structures. Plural batteries may be assembled prior to separation. After completion of the metal deposition steps, an adhesive, for example one or more dry adhesive sheets or screen printed wet adhesive, may be disposed on one or both of the wafers. The wafers may then be brought together in a wafer-adhesive-separator-adhesive-wafer sandwich, the adhesive cured and then individual batteries separated.

Figure 3:
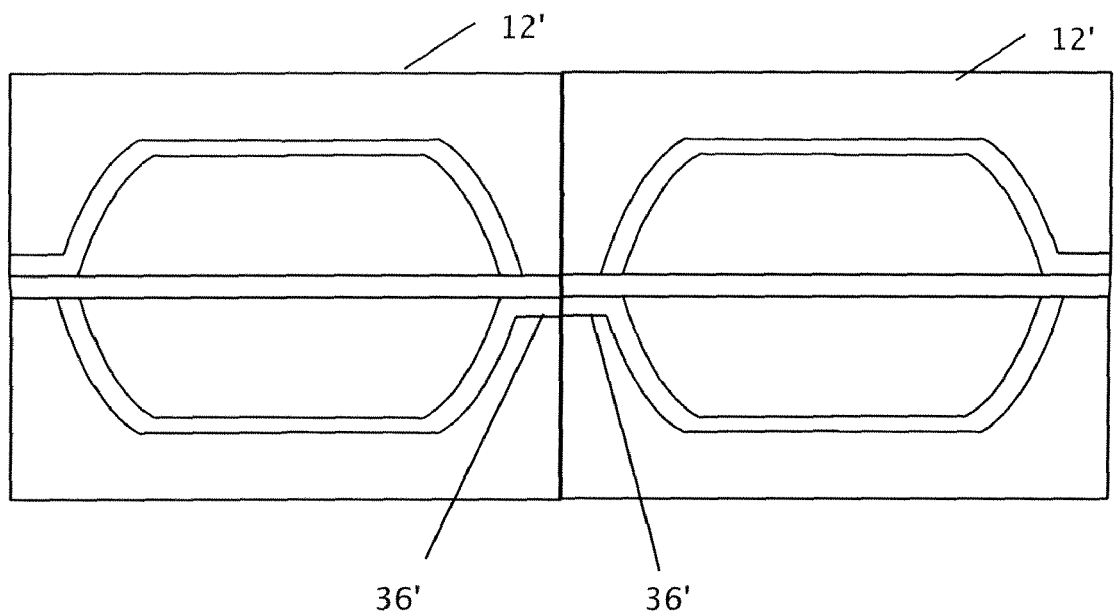
FIG. 3 is a schematic illustration of a multiple cell micromachined battery.

Plural processing of the micromachined battery further permits manufacture of multiple cell micromachined batteries. During the separation process, multiple cells may be left joined (see battery cells 12' depicted in FIG. 3). During formation of the current collectors 34 and the conductive taps 36, the conductive taps may be formed to link the multiple cells (see conductive taps 36') to provide a single output of the multiple cell micromachined battery.

The actual electrode, electrolyte and separator materials may be chosen for the application and may be improved using known optimization techniques. One such optimization technique is described by Albano, et al., *Design of an Implantable Power Supply for an Intraocular Sensor, Using POWER (Power Optimization for Wireless Energy Requirements)* and by Cook, et al., *POWER (power optimization for wireless energy requirements): A MATLAB based algorithm for design of hybrid energy systems*, Journal of Power Sources 159 (2006) 758-780.

Nickel cell chemistries offer the advantage of being radio frequency rechargeable. Silver cell chemistries may enhance reliability and provide discharge current stability. Thin film technologies, including lithium chemistries, pose potential processing difficulties when combining with a MEMS device due to potentially high processing temperatures required in the MEMS processing. However, some cell chemistries may are capable of withstanding temperatures up to 200° C.

The polymer bond to silicon, joining the micromachined battery 12 to the MEMS device 10 may be enhanced by first coating both parts with evaporated gold. A plasma enhanced chemical vapor deposition (PECVD) silicon nitride film may also enhance bonding. Gold and silicon are known to create a eutectic compound that has a much lower melting point than the pure metals. A liquid film is created in the joining process that bonds the two parts upon cooling and solidification.

Embodiments of batteries in accordance with the present invention may have one or more of the following characteristics:
1) formed and integrated at the same time of manufacturing with a MEMS device;
2) small and lightweight enabling creation of autonomous and remote sensor networks;
3) present high gravimetric and volumetric energy and power and Faradic efficiency superior to commercial batteries with the potential to meet (~27 mWh/cm$^2$);
4) low internal resistance and low power leakage due to high precision manufacturing;
5) thin film deposited electrodes;
6) stackable and/or layered electrodes to achieve higher voltages;
7) suitable for configuration as thin-film flat cells, prismatic stacks of cells, cylindrical cells or spirally wound cell
8) amendable to primary or secondary electrochemistries
9) compatible with solid thin-film electrolyte or liquid or gel solutions of electrolyte
10) capable of hermetic sealing;
11) mass produceable potentially reducing cost;
12) scalable to macroscopic battery size.

While application of batteries in accordance with the herein described embodiments in MEMS devices is apparent, the techniques are fully scalable, and large-scale deposited batteries are possible and desirable. Demonstration of the inventive technology for a small battery illustrates and validates the approach. The invention and embodiments of the invention therefore provide:

A) design and fabrication of optimized power supplies for MEMS with significantly reduced size and improved energy and power properties that allow integration at the time of manufacture or after manufacturing of the device is complete;
B) a fabrication technique based on thin-film deposition, allowing small scale, low-cost, and integrateable fabrication for CMOS systems;
C) characterization of capacity and lifetime of microbattery stacks, arrangements and multi-cells configurations; and
D) a process for forming microscopic electrode films on rigid or flexible substrates and a liquid, gel or solid electrolyte spacing by application of microarchitecturing techniques to the substrates.

While the invention is described in terms of several preferred embodiments of mounting assemblies that may be used in connection with fault protection devices, it will be appreciated that the invention is not limited to such devices. The inventive concepts may be employed in connection with any number of devices and structures. Moreover, while features of various embodiments are shown and described in combination, the features may be implemented individually each such single implementation being within the scope of the invention.

While the present disclosure is susceptible to various modifications and alternative forms, certain embodiments are shown by way of example in the drawings and the herein described embodiments. It will be understood, however, that this disclosure is not intended to limit the invention to the particular forms described, but to the contrary, the invention is intended to cover all modifications, alternatives, and equivalents defined by the appended claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Unless a claim element is defined by reciting the word "means" and a function without the recital of any structure, it is not intended that the scope of any claim element be interpreted based on the application of 35 U.S.C. §112, sixth paragraph.

We claim:
1. A method of making a battery comprising:
   etching or ablating a portion of a first substrate to form a first cavity within the first substrate;
   disposing within the first cavity a current collector material and an anode electrode material;
   etching or ablating a portion of a second substrate to form a second cavity within the second substrate that is different than the first substrate;
   disposing within the second cavity a current collector material and a cathode electrode material; and
   providing a separator between the first substrate and the second substrate to separate the anode electrode material from the cathode electrode material.
2. The method of claim 1, further comprising:
   forming a channel in one or both of the first and second substrates; and providing an electrolyte through the channel to be in contact with the anode electrode material, the cathode electrode material, and the separator.

3. The method of claim 1, wherein etching or ablating the portion of the first substrate and etching or ablating the portion of the second substrate include etching with or without masking, or ablation via application of a laser.

4. The method of claim 1, wherein disposing the anode and cathode materials includes use of chemical vapor deposition, plasma vapor deposition, chemical fluid deposition, electroplating, sintering, or sputtering.

5. The method of claim 1, wherein the first section and the second section, are joined by bonding the first substrate and the second substrate.

6. The method of claim 1, wherein the first substrate is a unitary body and the first cavity is formed in the unitary body of the first substrate, and the second substrate is a unitary body and the second cavity is formed in the unitary body of the second substrate.

7. The method of claim 1, wherein the first substrate includes an upper surface and a lower surface, the first cavity being formed by etching from the first surface toward the lower surface.

8. The method of claim 1, wherein each of the anode electrode material and the cathode electrode material comprises a porous microstructure.

9. The method of claim 1, wherein each of the first and second substrate comprises glass, the first cavity and the second cavity being formed by etching or ablating the glass.

10. The method of claim 9, wherein the glass comprises silicon oxide.

11. The method of claim 1, wherein the anode electrode material comprises a material selected from zinc, lithium metal (Li), graphite (C), meso carbon micro beads (MCMB), other carbon intercalation compounds, or a combination thereof.

12. The method of claim 1, wherein the cathode electrode material comprises a material selected from the group including silver oxide, lithium manganese oxide ($LiMn_2O_4$), lithium iron phosphate ($LiFePO_4$), $LiNi_xCO_yAl_zO_2$, $LiNi_xCO_yMn_zO_2$, and a combination thereof.

13. The method of claim 2, wherein the electrolyte comprises a material selected from potassium hydroxide (KOH), diethyl carbonate (DEC), dimethyl carbonate (DMC), ethylene carbonate (EC), ethyl methyl carbonate (EMC), propylene carbonate (PC), or any electrolyte that conducts ions and is electrically neutral.

14. The method of claim 2, wherein the channel is formed in one or both of the first and second substrates by micromachine drilling or chemical drilling.

* * * * *